United States Patent
Babliki

(10) Patent No.: US 7,459,411 B2
(45) Date of Patent: Dec. 2, 2008

(54) CERAMIC BUILDING ELEMENTS

(75) Inventor: David Babliki, Tel Aviv (IL)

(73) Assignee: B.B.B.-Development and Production of Building Products Ltd., Tel Aviv (IL)

( * ) Notice: Subject to any disclaimer, the term of this patent is extended or adjusted under 35 U.S.C. 154(b) by 411 days.

(21) Appl. No.: 11/250,300

(22) Filed: Oct. 14, 2005

(65) Prior Publication Data

US 2007/0087932 A1 Apr. 19, 2007

(51) Int. Cl.
*C04B 33/00* (2006.01)

(52) U.S. Cl. .................. 501/141; 501/155; 106/DIG. 1

(58) Field of Classification Search ............ 106/DIG. 1; 501/141, 155

See application file for complete search history.

(56) References Cited

U.S. PATENT DOCUMENTS

| | | |
|---|---|---|
| 2,576,565 A | 11/1951 | Brown |
| 3,679,441 A | 7/1972 | Harvey |
| 4,772,330 A | 9/1988 | Kobayashi |
| 4,780,144 A | 10/1988 | Loggers |
| 4,880,582 A | 11/1989 | Spanjer |

| | | | |
|---|---|---|---|
| 2006/0070406 A1 * | 4/2006 | Raichel et al. | ............. 65/134.8 |

FOREIGN PATENT DOCUMENTS

| | | | |
|---|---|---|---|
| CN | 1181363 | | 5/1998 |
| CN | 1213655 | | 4/1999 |
| CN | 1225906 | | 8/1999 |
| DE | 4338264 | | 5/1994 |
| IL | 61279 | | 10/1980 |
| JP | 02005060159 A | * | 3/2005 |
| RU | 2005109 C1 | * | 12/1993 |
| SU | 1038319 A | * | 8/1983 |

OTHER PUBLICATIONS

Derwent acc # 1984-132810 SU 1038319 A (Sherstyuko et al.) Aug. 30, 1983 (abstract).*
JP 02005060159 A (Yamazaki et al.) Mar. 10, 2005 (abstract).*
Derwent acc# 1994-124793 RU 2005109 C1 (Bobrik et al.) Dec. 30, 1993 (abstract).*

* cited by examiner

*Primary Examiner*—Paul Marcantoni
(74) *Attorney, Agent, or Firm*—Citadel Patent Law; George A. Leone; J. A. Claypool

(57) ABSTRACT

A ceramic building element made from a mixture comprising 20% to 80% clay, 20% to 80% fly ash, 0.5% to 5.0% of oily organic material, and 5% to 15% water. The oily organic material may be selected from the group consisting of sediment and silt, the sediment and silt being further selected from at least one site including a river, a lake, a seabed and swamp land.

16 Claims, No Drawings

CERAMIC BUILDING ELEMENTS

FIELD OF THE INVENTION

The present invention relates to ceramic building elements such as blocks, bricks, tiles or plates useful in the construction of buildings. These building elements are decorative and possess exceptional strength and water resistance. They are also relatively inexpensive.

BACKGROUND OF THE INVENTION

In the preparation of ceramic products, it is customary to use as raw materials various forms of clay, shale, and the like. With the proliferation of electric power plants for generating electricity from coal there are generated substantial amounts of waste products, one of which is fly ash. Great effort has been made to find useful outlets for these coal waste products, in particular, fly ash. One of the uses for which coal fly ash has been recommended is for making ceramic and other construction materials.

Israeli Patents 61279 published Jul. 31, 1984 and 87143 published Nov. 21, 1991 (also published as U.S. Pat. No. 4,880,582, issued Nov. 14, 1989), disclose the use of small amounts of fly ash in building materials.

U.S. Pat. No. 2,576,565, issued Nov. 27, 1951 discloses ceramic products made from fly ash, slag and bentonite.

U.S. Pat. No. 3,679,441, issued Jul. 25, 1972 discloses ceramic products made from fly ash and plasticizer such as "Carbopol".

U.S. Pat. No. 4,772,330, issued Sep. 20, 1988 describes a process for preparing a low water absorbing artificial lightweight aggregate using coal ash having a specific range of particle size and a hydraulic material.

EP 0222457, published May 20, 1987 (also published as U.S. Pat. No. 4,780,144, issued Oct. 25, 1988) discloses a method of producing a building element made form fly ash and $Ca(OH)_2$ processed in a particular manner.

SUMMARY OF THE INVENTION

The present invention provides a ceramic building element made from a mixture or slurry comprising 20% to 80% clay, 20% to 80% fly ash, 0.5% to 5.0% of oily organic material, and 5% to 15% water. The oily organic material may be selected from the group consisting of sediment and silt, the sediment and silt being further selected from at least one site including a river, a lake, a seabed and swamp land.

In another aspect the present invention provides a process for manufacturing a ceramic building element comprising the steps of:
 a) providing a mixture of clay, fly ash, sediment or silt and water including
   i) 20% to 80% clay,
   ii) 20% to 80% fly ash,
   iii) 0.5% to 5.0% of oily organic material, and
   iv) 5% to 15% water;
 b) casting the mixture in a mold of the desired shape under pressure between 250 kg/cm² and 700 kg/cm² and releasing a casting of the element from the mold;
 c) heating the casting in an oven in a controlled manner up to a temperature of between 350° C. and 600° C. to vent gases and vapors, and maintaining that temperature for 20 to 90 minutes;
 d) raising the temperature in the oven in a controlled manner to between 1000° C. and 1300° C. and maintaining that temperature for 20 to 90 minutes;
 e) allowing the oven to cool in a controlled manner to form a shaped element; and
 f) removing the shaped element from the oven.

It is an object of the present invention to provide ceramic building elements using clay and fly ash.

Another object of the invention is to provide ceramic building elements that are stronger and less water absorbing than corresponding conventional building materials.

A further object of the invention is to provide a ceramic building element that can compete economically with conventional building materials.

A still further object of the invention is to provide a ceramic building element that has substantially no significant radon radiation and therefore subscribes to the most stringent building code requirements.

It is also an object of the invention to provide a process for manufacturing economic ceramic building elements from clay and fly ash having substantially no significant radon radiation.

DESCRIPTION OF THE PREFERRED EMBODIMENT

The invention is described herein with respect to specific examples of ceramic building elements, however, it will be understood that these examples are for the purpose of illustrating the principals of the invention, and that the invention is not so limited.

The present invention thus relates to a ceramic building element made from a mixture or slurry comprising:
 a) 20% to 80% clay
 b) 20% to 80% fly ash,
 c) 0.5% to 5.0% sediment or silt selected from river, lake or seabeds and swamp land, said sediment or silt comprising oily organic material, and
 d) 5% to 15% water.

The clay used in accordance with this invention can be almost any clay material and does not have to be of high quality such as is generally required for quality floor tiles and sanitary vessels such as sinks, bathtubs and toilet bowls. We found the clays supplied by Negev Industrial Minerals Ltd., Israel, such as Negev 47, Negev 46/48, Negev 50/52 and Negev S 5 to be quite satisfactory for use in the present invention. The amount of clay in the mixture in accordance with this invention can preferably range anywhere from 20%-80% and most preferably from 30%-60%.

The fly ash for use in the present invention should preferably have a very small particle size, and the particles are generally characterized by a pitted surface and high reactivity, generally in the range of 300 mesh. For some applications, however, it is quite possible to use larger particle fractions. The fly ash can preferably range in the order of 20%-80% and most preferably from 45%-70%.

The sediment or silt for this invention may advantageously be mud obtained from river beds, the bottoms of lakes, or seas, swamp lands or from areas, including aqueous geological bodies, which are or were under bodies of water containing organic matter. This mud comprises an oily organic material that can be characterized by its oily texture, ease of dispersability in water and its smooth spreadability over a surface. We found that the mud from areas in or around Israel including the Dead Sea and the Hula swamp basin are very suitable for this invention. Similarly, oily organic material from Hamat Gader provides a suitable sediment or silt. Also peat is believed to be effective as some of the sediments. The sediment or silt is used in very small amounts and surprisingly imparts to the ceramic element products exceptional strength and low water absorption, smooth surfaces and most surprisingly results in the elimination of Radon gas exhalation from such ceramic elements to a degree unknown before in building materials of this kind. The amount of mud that can be used according to the invention is between 0.5% and 5.0%, with a range of 1.0%-3.0% being preferred. Larger amounts of sediment do not provide any advantage and may produce elements of inferior quality. It is presumed that the sediment helps adhere the particles of clay and fly ash to form a strong bond. Moreover, the mud acts as a lubricant and helps in releasing the ceramic articles, such as blocks and bricks, from their molds.

The water is beneficial for obtaining a thorough mixing and also helps in the conversion to a ceramic product. The preferred amount of water is between 7% and 12%.

very desirable since the trend today in the building trade is to require minimum Radon exhalation.

The products of this invention have a very smooth and appealing finish with outstanding strength, insulating properties and resistance to water absorption. Because of these properties, blocks made in accordance with the invention, can be used to make self-supporting walls that do not require any further plastering. Ceramic building elements constructed in accordance with the present invention may be formed into shapes including blocks, bricks, plates, slabs, tiles, or cladding.

The following examples, shown in Table 1, illustrate the present invention. The ingredients were mixed and molded into ceramic bricks under pressure and fired as indicated, and cooled to room temperature at a rate of 2° C./minute.

TABLE 1

| EXAMPLE | Clay[a] % | Fly Ash % | Sediment % | Water % | Compress. Pressure kg/cm$^2$ | Firing ° C. | Compress. strength kg/cm$^2$ | Moisture absorption % | Radon gas exhalation rate[e] |
|---|---|---|---|---|---|---|---|---|---|
| 1 | 52.0 | 39.0 | 1.0[b] | 8.0 | 450 | 1050 | 19.7 | 13.0 | 0.068 |
| 2 | 41.5 | 49.0 | 1.0[b] | 8.5 | 550 | 1150 | 44.7 | 3.8 | 0.009 |
| 3 | 31.0 | 58.5 | 1.5[b] | 9.0 | 570 | 1170 | 38.0 | 4.9 | 0.016 |
| 4 | 20.0 | 68.0 | 2.0[b] | 10.0 | 590 | 1200 | 27.4 | 8.5 | 0.07 |
| 5 | 50.0 | 41.0 | 2.0[c] | 8.0 | 470 | 1100 | 19.0 | 12.0 | 0.052 |
| 6 | 64.0[d] | 27.0 | 1.0 | 8.0 | 550 | 1150 | 34.0 | 7.0 | 0.005 |

[a]Negev clay
[b]Sediment from Hula Swamp
[c]Sediment from Dead Sea
[d]Motza clay
[e][mBq · m$^2$ · s$^{-1}$]

Other filler materials may also be added such as fine sand and finely ground glass.

The ceramic articles are manufactured in the following way. After thorough mixing, the mixture is poured into a suitable mold in which it is formed to the desired shape by application of pressure as is known in the art, generally between 250 kg/cm$^2$-700 kg/cm$^2$ preferably between 400 kg/cm$^2$ to 650 kg/cm$^2$. The shaped article, for example a building block, is then removed from the mold and placed in an oven at room temperature. The oven, provided with air vents to allow vapors and gases to escape, is then heated up to about 350° to 600° C. in a controlled manner, depending on the desired properties of the end product, and the temperature is maintained for about 20 to 90 minutes during which time volatiles such as gases and water vapor are released from the molded articles and vented. The temperature is then raised to about 1000° C.-1300° C. and maintained there for about 20 to 90 minutes before allowing the oven to cool down, either by shutting it off or in a controlled manner. The cooled article generally has a reduced volume of between 2% to 5% from the original molding. The hardness, color and water resistance of the final ceramic article is determined by the temperature/time factor in the firing process as is known in the art.

The ceramic building elements of this invention can be used in their natural colors which range from off-white to orange or brown, depending mostly on the origin of the clay and the manufacturing conditions, or they may be colored by adding pigments.

A particularly beneficial property of the ceramic articles of this invention is their substantially complete absence of Radon gas exhalation which is generally common with earth derived building materials. This makes the inventive products It will be appreciated that the invention is not limited to what has been described hereinabove merely by way of example. Rather, the invention is limited solely by the claims which follow, wherein the word comprise, and variations thereof, such as comprising, comprised and the like, are to be understood as indicating that the listed components or steps are included, but not necessarily to the exclusion of other components or steps.

What is claimed is:

1. A ceramic building element made from a mixture comprising:
   a) 20 wt % to 80 wt % clay;
   b) 20 wt % to 80 wt % fly ash;
   c) 0.5 wt % to 5.0 wt % of oily organic material, wherein the oily organic material is selected from the group consisting of mud, sediment and silt, and wherein the oily organic material is from at least one site selected from the group consisting of a river, a lake, a seabed and swamp land; and
   d) 5 wt % to 15 wt % water.

2. A ceramic building element as in claim 1, wherein the at least one site is the Dead Sea.

3. A ceramic building element as in claim 1, wherein the at least one site is the Hula swamp basin.

4. A ceramic building element as in claim 1, wherein the at least one site is Hamat Gader.

5. The ceramic building element of claim 1, wherein the elements a) through d) are formed into blocks, bricks, plates, slabs, tiles, or cladding.

6. A ceramic building component made from a slurry comprising:

a) 20 wt % to 80 wt % clay;

b) 20 wt % to 80 wt % fly ash;

c) 0.5 wt % to 5.0 wt % of oily organic material, wherein the oily organic material is selected from the group consisting of mud, sediment and silt, and wherein the oily organic material is from an aqueous geological body selected from the group consisting of a riverbed, a lakebed, a seabed, marshland and swamp land; and d) 5 wt % to 15 wt % water.

7. The ceramic building component of claim 6, wherein said oily organic material is sediment from at least one site selected from the group consisting of the Dead Sea geological area, the Hula swamp basin, and the Hamat Gader geological area.

8. The ceramic building component of claim 6, wherein the ceramic building component is made in the form of a block, brick, plate, slab, tile, or cladding.

9. The ceramic building element of claim 1, wherein the fly ash is limited to 30 wt % to 80 wt %.

10. The ceramic building component of claim 6, wherein the fly ash is limited to 30 wt % to 80 wt %.

11. The ceramic building element of claim 1, wherein:

a) the clay is limited to 30 wt % to 60 wt %;

b) the fly ash is limited to 45 wt % to 70 wt %;

c) the oily organic material is limited to 1.0 wt % to 3.0 wt %; and d) the water is limited to 7.0 wt % to 10 wt %.

12. The ceramic building element of claim 1, wherein:

a) the clay is limited to 20 wt % to 64 wt %;

b) the fly ash is limited to 27 wt % to 68 wt %;

c) the oily organic material is limited to 1.0 wt % to 2.0 wt %; and d) the water is limited to 8.0 wt % to 10 wt %.

13. The ceramic building component of claim 6, wherein:

a) the clay is limited to 30 wt % to 60 wt %;

b) the fly ash is limited to 45 wt % to 70 wt %;

c) the oily organic material is limited to 1.0 wt % to 3.0 wt %; and d) the water is limited to 7.0 wt % to 10 wt %.

14. The ceramic building component of claim 6, wherein:

a) the clay is limited to 20 wt % to 64 wt %;

b) the fly ash is limited to 27 wt % to 68 wt %;

c) the oily organic material is limited to 1.0 wt % to 2.0 wt %; and d) the water is limited to 8.0 wt % to 10 wt %.

15. The ceramic building component of claim 6, wherein said oily organic material is silt from at least one site selected from the group consisting of the Dead Sea geological area, the Hula swamp basin, and the Hamat Gader geological area.

16. The ceramic building component of claim 6, wherein said oily organic material is mud from at least one site selected from the group consisting of the Dead Sea geological area, the Hula swamp basin, and the Hamat Gader geological area.

* * * * *